Dec. 10, 1968  H. OELKERS ET AL  3,414,991

TEXTILE PROCESSING AND HANDLING APPARATUS

Filed May 21, 1964  13 Sheets-Sheet 1

Inventors:
HEINRICH OELKERS
HEINZ O. MANIG
By Lowry & Rinehart
ATTYS.

Dec. 10, 1968 H. OELKERS ET AL 3,414,991
TEXTILE PROCESSING AND HANDLING APPARATUS
Filed May 21, 1964 13 Sheets-Sheet 2

Inventors:
HEINRICH OELKERS
HEINZ O. MANIG
By Lowry & Rinehart
ATTYS.

Dec. 10, 1968   H. OELKERS ET AL   3,414,991
TEXTILE PROCESSING AND HANDLING APPARATUS
Filed May 21, 1964   13 Sheets-Sheet 4

Inventors:
HEINRICH OELKERS
HEINZ O. MANIG
By Lowry & Rinehart
ATTYS.

Dec. 10, 1968  H. OELKERS ET AL  3,414,991
TEXTILE PROCESSING AND HANDLING APPARATUS
Filed May 21, 1964  13 Sheets-Sheet 6

Inventors:
HEINRICH OELKERS
HEINZ O. MANIG
By Lowry & Rinehart
ATTYS.

Inventors:
HEINRICH OELKERS
HEINZ O. MANIG

Dec. 10, 1968  H. OELKERS ET AL  3,414,991
TEXTILE PROCESSING AND HANDLING APPARATUS
Filed May 21, 1964  13 Sheets-Sheet 12

Inventors:
HEINRICH OELKERS
HEINZ O. MANIG
By Lowry & Rinehart
ATTYS.

Dec. 10, 1968  H. OELKERS ET AL  3,414,991
TEXTILE PROCESSING AND HANDLING APPARATUS
Filed May 21, 1964  13 Sheets-Sheet 13

Fig. 29

Inventors:
HEINRICH OELKERS
HEINZ O. MANIG
By Lowry + Rinehart
ATTYS.

United States Patent Office 3,414,991
Patented Dec. 10, 1968

3,414,991
TEXTILE PROCESSING AND HANDLING
APPARATUS
Heinrich Oelkers, Duckwitzstrasse, Bremen, Germany,
and Heinz Otto Manig, Bremen, Germany; said Manig
assignor to said Oelkers
Filed May 21, 1964, Ser. No. 369,237
Claims priority, application Germany, May 24, 1963,
O 9,442; July 27, 1963, O 9,579; Nov. 7, 1963,
O 9,772
9 Claims. (Cl. 38—2)

ABSTRACT OF THE DISCLOSURE

A combination of textile fabric processing machine and transportable winding device for handling and temporary storage of said fabrics, the winding device having at least two winding rolls and a winding band. The processing machine, such as a mangle, wringer, folder, or feeder and spreader, is coupled to said winding device by a releasable coupling, the machine and device respectively each having a complementary coupling element. The coupling element on the processing machine is positioned to engage the corresponding element on the winding device when the machine and device are in closely adjacent operative contact. The processing machine and winding band on the winding device each have a drive means, and these drive means are in releasable driving engagement when the coupling elements are engaged, the transportable winding device thereby being driven in a similar direction and at a speed synchronous to that of said textile processing machine.

Feeding equipment for textile fabrics being processed, hereinafter called washing, which is constructed as a winding roller, is known, In this construction, the individual pieces of washing to be treated, for example mangled, are placed on a band and wound onto a winding roller piece by piece, side by side, and one behind the other. Subsequently, the winding roller is unwound again and the individual pieces of washing are fed by the band into the mangle.

In such winding rollers it is already known to arrange two rollers one above the other in a common frame, the winding band for receiving the individual pieces of washing or for delivering the washing being wound onto one or the other of the two winding rollers.

In this known arrangement, the pair of winding rollers is provided with a common drive. The obtain a constant peripheral speed for both winding rollers despite the continually changing roller diameters, the winding rollers are driven through the intermediation of friction rollers, i.e. each winding roller is associated with a pair of parallel friction rollers. The winding rollers are mounted so as to be adjustable in height and bear with their periphery under the force of gravity on the two friction rollers. All friction rollers of the two winding rollers are driven in common at constant speed. The gearing constructed in this manner is relatively complicated and susceptible to trouble. The vertically adjustable mounting of the two winding rollers is particularly disadvantageous.

It is further known to arrange devices for feeding washing into a mangle or the like on a freely transportable carriage. These known devices, however, do not use winding rollers but a supporting structure for hanging up long pieces of washing having a large surface area.

Furthermore, the use of brushes, bands, resiliently biased and shaped rollers as well as brush rollers for spreading the washing before it enters the mangle, is well known in the art. Such rollers may be arranged across or parallel to the feed direction of the washing at the feed end of the mangle. In this connection it is also known to dispose a pair of rollers for spreading and smoothing the washing, which extend at an angle to each other, above the washing in a place just preceding the point where the washing enters the mangle.

For the spreading of pieces of washing likewise a device is known in which nozzles or jets are arranged above conveyor belts receiving the washing, said nozzles or jets being disposed to direct a blast jet over the surface of the washing transversely of the feed direction thereof.

Finally, also speed controls for winding rollers are known, in which a contact roller bears against the periphery of the winding roller. Such winding roller, however, is not intended to receive individual pieces of washing.

It is an object of the invention to provide a new and useful combination of textile fabric processing machine and transportable winding device for handling and temporary storage of textile fabrics, in which the textile fabric processing machine and winding device are each modified so that the portable winding device may be attached to any one of a number of processing machines, will be held coupled thereto and will be driven in a similar direction and at a synchronous speed, to the processing machine.

The hitherto customary winding devices are unsatisfactory as to the capability of attaching the storage and feeding facilities as often as desired to any of a number of washing processing or treating machines such as mangles, wringers, folding machines or the like, which are frequently placed a considerable distance apart from one another, far charging the same.

The known winding devices are unsatisfactory also with regard to their drives, since the continually changing diameter of the winding roller is not taken into account relative to the driving speed, and also with regard to the fact that storing the washing by means of the winding band has hitherto been inconvenient and that particularly the charging of the washing treating machine, for example the feeding of a mangle or the like, has been possible in each case only with one and the same washing treating machine.

Another object of the invention is to provide a traveling winding device for the storage of the washing to be treated, which is freely transportable in all directions and thus can be moved up and attached to a washing treating machine.

Generally, the individual pieces of washing have to be carefully spread and smoothed before being placed onto the winding band or, if no winding device is used, prior to being fed into the washing treating machine, which is time-consuming and difficult when done by hand.

Still another object of the invention therefore consists in solving the problem of mechanically spreading and smoothing the washing on or in front of the winding band or, when no winding band is used, outside the washing treating machine.

To attain this object, the invention further provides a feeding and spreading device for feeding, preferably with the interposition of a winding device, the washing to be treated in a smoothly spread state to the washing treating machine, it being possible to provide the said feeding and spreading device in a form or construction permitting it to be attached to the washing treating machine.

It is also an object of the invention to simplify and expedite the feeding of washing into a washing treating machine, particularly a mangle, by using a winding device.

By a feeding and spreading device attachable to the winding device the individual pieces of washing will be fed in a spread state to the winding device before being wound onto the winding roller thereof. This measure eliminates spreading and placing the washing by hand, as has hitherto been customary. The pieces of washing will be spread and fed to the winding device without any expenditure of manpower.

To attain this object, the invention provides a feeding and spreading device which comprises a frame freely transportable in all directions, a pair of vertically spaced winding rollers mounted on said frame, driving means for said winding rollers, a winding band connecting said winding rollers and a guide roller arranged in the path of said winding band to deflect the same, said winding band extending from the upper winding roller in a substantially horizontal plane toward said guide roller to form a table-like supporting surface for the washing, and from said guide roller to the lower winding roller. Conveniently, a spreading unit for feeding the washing in a smoothly spread state to the winding machine is provided on the table-like extending supporting surface of the winding band and may be attachable or removable.

As a novel feature, the feeding and spreading device may be mounted on a special frame above circulating endless conveyor belts to constitute a device separate from but cooperative with the storage device.

In the form proposed by the present invention, the winding device and the feeding and spreading device form a mobile assembly which can be attached to the washing treating machine as desired. Such independent mobility of the assembly has the advantage of permitting the washing to be wound onto winding rollers and stored at any desired place within the laundry until it is to be supplied to the mangle or the like washing treating machine.

Further features of the present invention relate to the arrangement and mounting of the brush rollers and to the disposition of means for retaining the washing on the winding band.

According to another feature of the invention, a freely movable winding device may be attached with regard to its adjusted position and its drive to the feeding and spreading device or to the mangle, respectively, by means of coupling devices. In this arrangement, the winding device and the feeding and spreading device are separate units and the feeding and spreading device as well as the mangle may be stationary in different places of the laundry, whereas the traveling winding device can be freely moved between the feeding and spreading device constituting the charging station and the mangle constituting the delivery station.

Other features are concerned with the design of the clutch for obtaining a uniform drive for the winding device and the feeding and spreading device, as well as with the construction of the stationary separate feeding and spreading device. In this conjunction it is proposed by the invention that the different expedients for the simultaneous guiding and spreading of the washing may be disposed above the feeding and spreading device.

Further features of the invention relate to means for inserting the washing in the feeding and spreading device. For example, several driven spreading rollers provided with helical ribs may be arranged in series with longitudinal conveyor belts, the washing to be spread being alternately guided with either of its two surfaces over the said spreading rollers which with regard to their successive operating periphery are effective in opposite senses. The design and the mounting of such spreading rollers are also special features of the present invention.

The invention also contemplates providing the individual conveyor belts of the feeding and spreading device with ribs, hook means or the like.

Several embodiments of the invention will now be described by way of example and with reference to the accompanying drawings, in which.

With reference now to the drawings, the assembly proposed by the invention for the rapid and trouble-free feeding of washing W into a washing treating machine, particularly a mangle, generally comprises in combination a traveling winding device A and a feeding and spreading device B.

The winding device A has a movable frame 12 mounting two winding rollers 11 and 13 interconnected by a winding band 10, and can be attached to any type of washing treating machine, for example a mangle, a wringer or the like.

Figure 10:
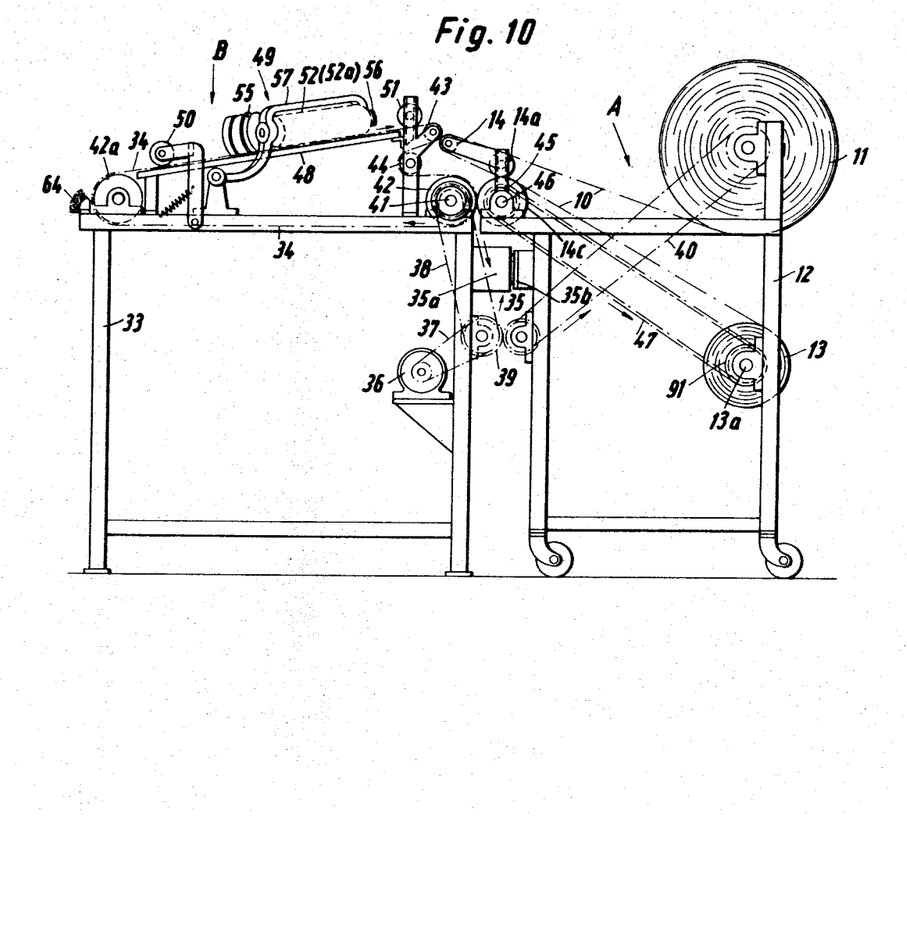
FIG. 10 is a schematic side elevational view of a different embodiment of the assembly according to the invention, comprising a separate winding device and an attachable feeding and spreading device.
Figures 11, 13, 14:
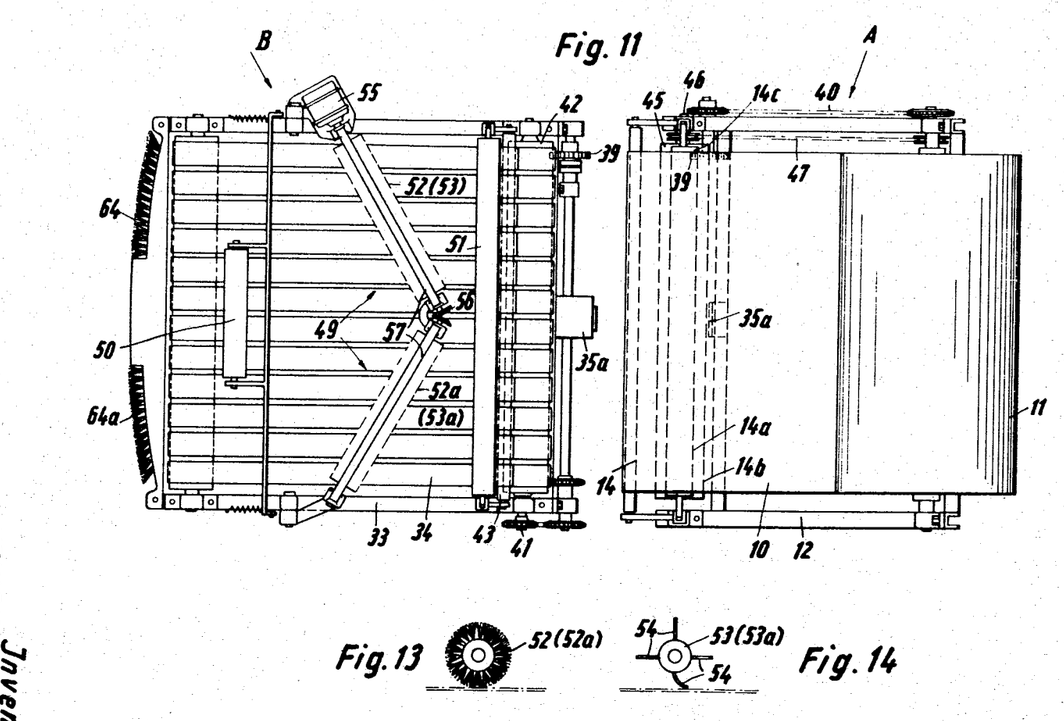
FIG. 11 is a top plan view of the assembly shown in FIG. 10, with the feeding and spreading device, however, being detached from the winding device.
FIG. 13 is an end view of spreading means according to a first embodiment.
FIG. 14 is a similar view of spreading means according to a second embodiment.
Figure 23:
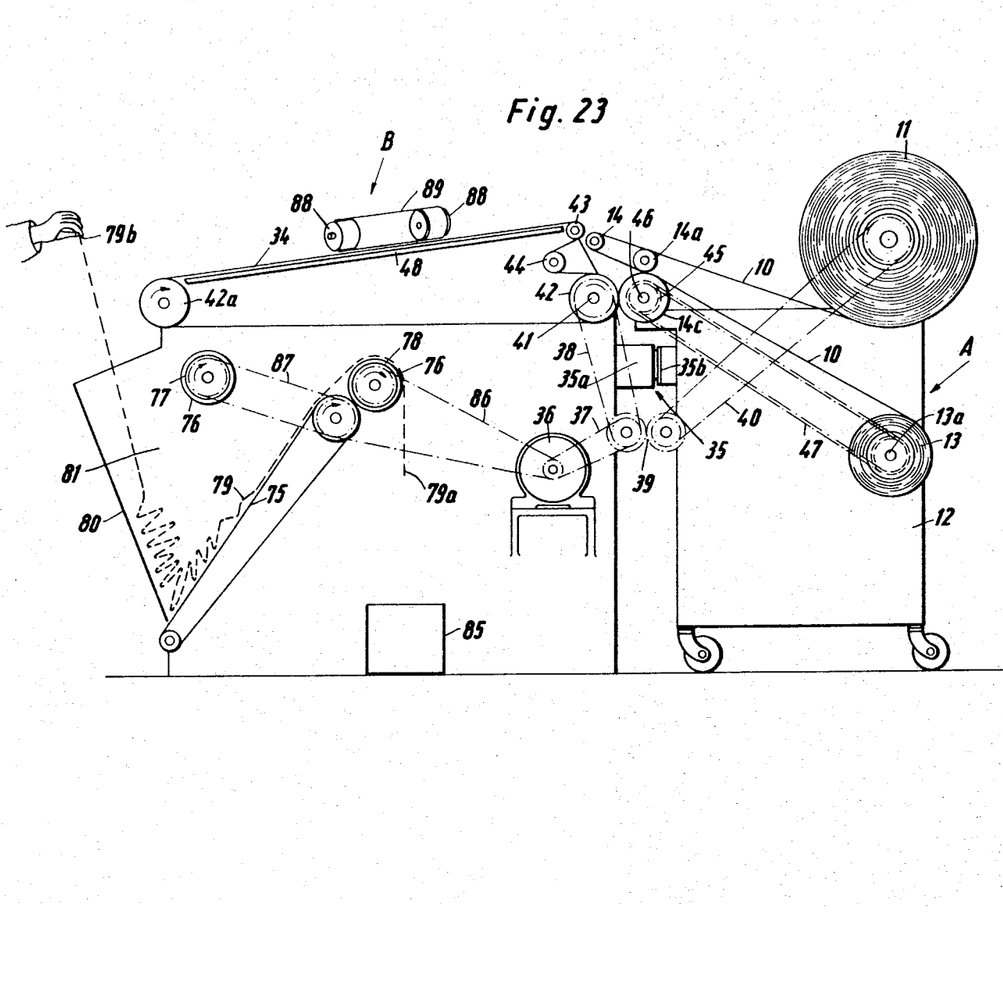
FIG. 23 is a schematic side elevational view of a further embodiment of the assembly according to the invention, comprising a freely movable winding device and an attachable feeding and spreading device with auxiliary feeding means.

The feeding and spreading device B serves for feeding the pieces of washing W rapidly and smoothly, i.e., free from creases, into the winding device A and may either be a component of the latter (FIG. 5) or a separate unit adapted to be coupled therewith as regards the drive (FIGS. 10, 11 and 23).

Referring to FIGS. 1 to 4, exclusively the principle of the winding device A will first be explained.

Figure 1:
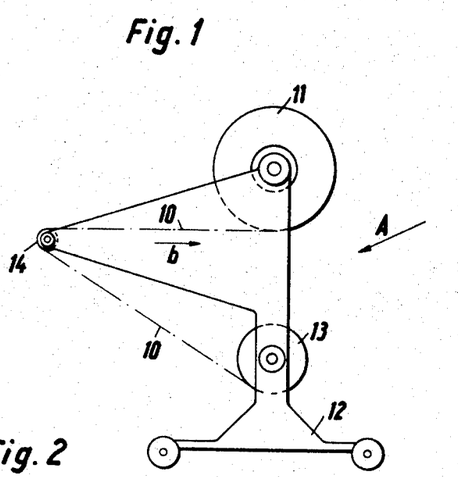
FIG. 1 is a schematic side elevational view of a winding device according to the invention;
device.
Figure 2:
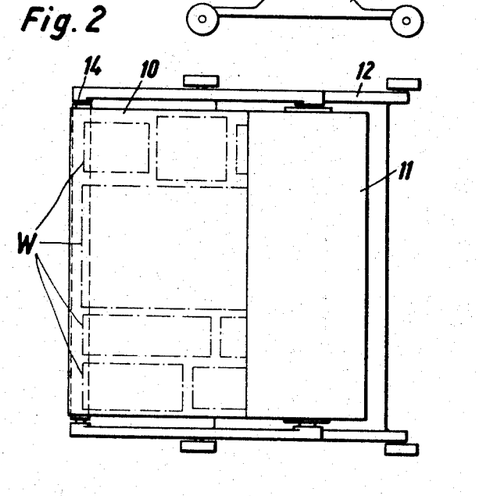
FIG. 2 is a schematic top plan view of the winding device.

As can be seen from FIGS. 1 and 2, the finite winding band 10, which may be in one piece or consist of a plurality of individual bands, belts or the like, is secured with its ends to the respective winding rollers 11 and 13 and passes over a guide roller 14. The winding band 10 constitutes a table-like advancing support adapted to receive and carry different pieces of washing W placed thereon, for example, as shown in FIG. 2. For driving the winding rollers 11 and 13, special motors are provided which will be described hereinafter. When winding the washing W onto the roller 11, the winding band 10 will unwind from the roller 13 and move in the direction indicated by arrow b (FIG. 1). The winding band 10 may, if necessary, be supported by guide means or the like, not shown.

The individual pieces of washing W are placed by hand on the winding band 10 and may also be smoothed or spread by hand or even mechanically as described hereinafter.

Figure 3:
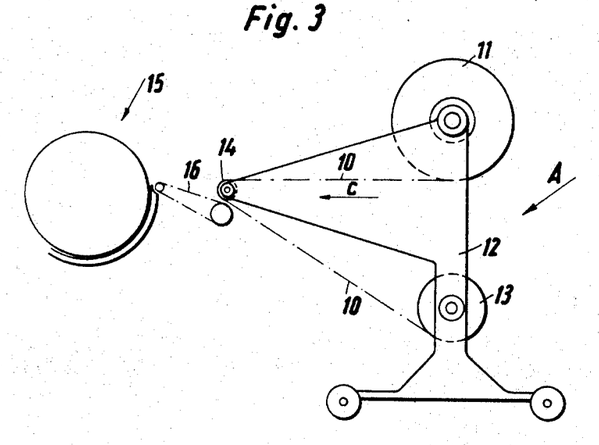
FIG. 3 is a view similar to FIG. 1, showing the winding device associated with a mangle.

When a great number of individual pieces of washing W have been wound onto the winding roller 11, the winding device A is moved up to the washing treating machine, for example a mangle 15 as shown in FIG. 3. The mangle 15 may be of the conventional type and comprise, for example, a series of mangle rollers and circulating feeding belts 16.

The winding device A now is disposed so that the guide roller 14 is in a position close to the feeding belts 16 of the mangle 15. For delivering the washing W to the mangle 15, the winding band 10 is unwound from the winding roller 11 in the direction of arrow c (FIG. 3) and wound onto the winding roller 13 so that when the winding band is deflected by the guide roller 14 the washing W will drop onto the feeding belts 16 of the mangle 15. In this arrangement, the speeds of the winding band 10 and of the feeding belts 16 are synchronized to obtain a continuous feed of the washing W. Likewise, also the feed of the washing W into the winding device A can be obtained in a continuous manner, namely by utilizing the possibility of adapting the winding speed of the winding roller 11 to the performance of the respective operator.

Conveniently, the winding band 10 has the same width as the winding roller 11. In particular, such winding band may consist of thin textile or plastics sheet material which may be porous. The winding band 10 may also be constituted by a plurality of individual bands arranged side by side in spaced relationship.

Figure 4:
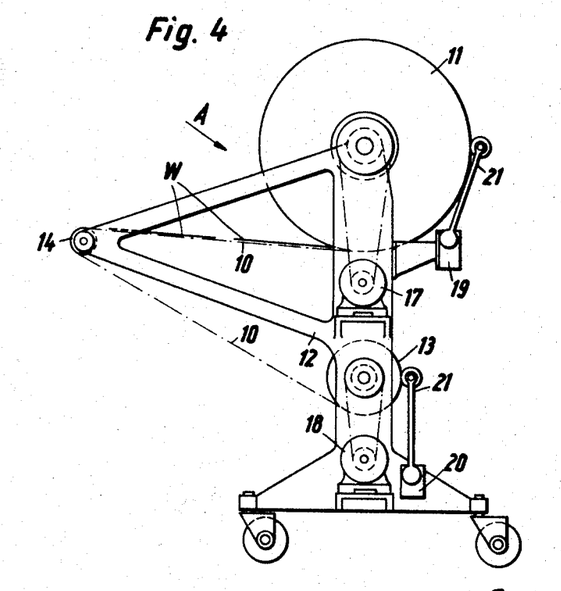
FIG. 4 is a schematic side elevational view of a winding device according to the invention, showing details thereof and particularly speed controlling means for the winding rollers.

As can be seen from FIG. 4, driving motors 17 and 18 for rotating the winding rollers 11 and 13 are mounted on the frame 12. Since during the winding operation the washing W being wound onto, or unwound from, the winding rollers 11 and 13 cause the diameters of the latter to vary continually, speed control means 19 and 20 are provided for the driving motors 17 and 18, which are governed in dependence on the actual winding roller diameters by means of respectively associated control levers 21 contacting the peripheries of the winding rollers 11 and 13.

Figures 5, 6:
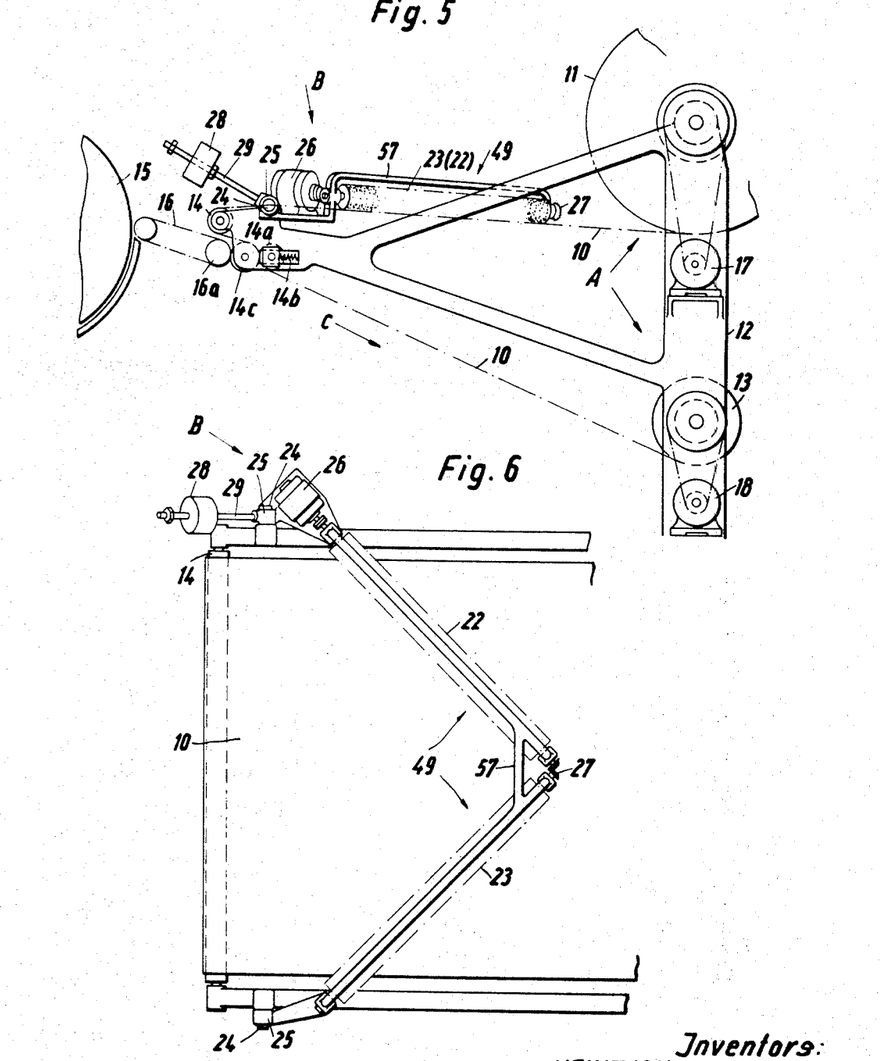
FIG. 5 is a schematic side elevational view of details of an entire assembly according to the invention, comprising a winding device and a feeding and spreading device.
FIG. 6 is a top plan view showing certain details of the feeding and spreading device.

FIGS. 5 and 6 show the winding device A associated with a feeding and spreading device B comprising a washing spreading unit 49 made up, for example, of a pair of driven brush rollers 22 and 23 symmetrically extending from either side of the winding band 10 diagonally toward the longitudinal middle axis thereof. The brush rollers 22 and 23 are carried by a supporting structure 57 mounted on either side of the winding band 10 on horizontal pivots 24 by means of pivot bearings 25. Due to this arrangement, the brush rollers 22 and 33 can be swung off the surface of the winding band 10. In the illustrated embodiment, only the brush roller 22 is driven by a motor 26 carried by the respective pivot bearing 25 and a bevel gearing 27 is provided at the adjacent free ends of the brush rollers 22 and 23 for transmitting the movement from the former to the latter thereof. It is self-evident that as a modification of the illustrated embodiment either of the brush rollers 22 and 23 may be provided with a proper driving motor.

As to their swinging movement, the pivotally arranged brush rollers 22 and 23 are acted upon by a weight 28, which is displaceably mounted on a rod 29, in such a manner that the position of the brush rollers 22 and 23 is automatically adapted to the actual level of the winding band 10 varying as a function of the diameter of the winding roller 11. When feeding washing W into the mangle 15, the brush rollers 22 and 23 may be swung off the winding band 10 for example by shifting the weight 28 toward the free end of the rod 29.

The winding band 10 to be unwound for feeding the washing W into the mangle 15 may also be driven in dependence on the driven feeding belts 16 of the mangle 15. In this case, as illustrated in FIG. 5, to unwind the winding band 10 this can be driven, for example, by gear or friction drive of a driving roller 14c from a roller 16a of the feeding belts 16 of the mangle 15.

To ensure that the winding band 10 is positively driven by the driving roller 14c, the winding band 10 is forced against the driving roller 14c by a pressure roller 14a biased by a spring 14b.

Figure 7:
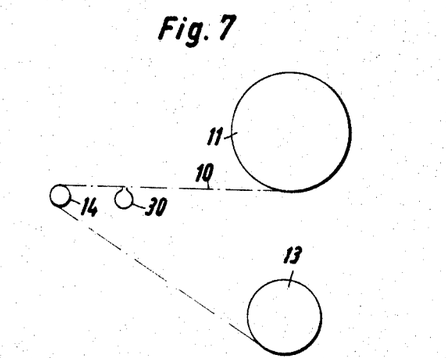
FIG. 7 is a schematic view showing suction means as an additional expedient for retaining pieces of washing on the winding band of the winding device.
Figure 8:
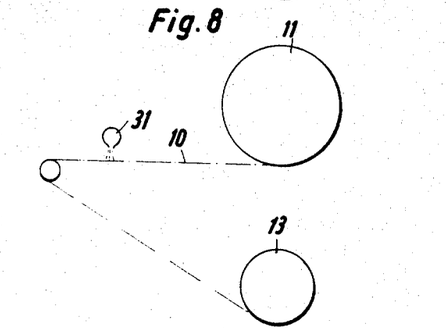
FIG. 8 is a similar view showing air blast means as an additional expedient for retaining pieces of washing on the winding band of the winding machine.
Figure 9:
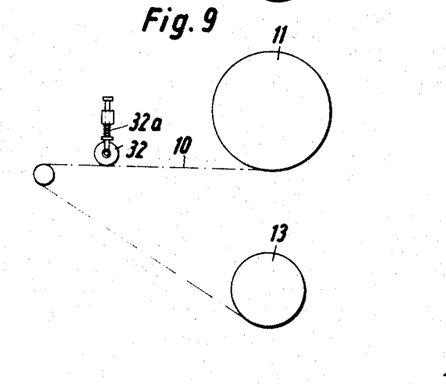
FIG. 9 is a similar view showing biased presser means as a nadditional expedient for retaining pieces of washing on the winding band of the winding device.

FIGS. 7 to 9 schematically show the arrangements of different expedients used as additional means for retaining the washing W on the wnding band 10.

The embodiment of FIG. 7 uses a suction pipe 30 disposed under the winding band 10. If desired, also several suction pipes or suction boxes may be provided.

The embodiment of FIG. 8 uses a compressed-air pipe 31 provided with appropriate jets, slots or similar openings suitable to direct a jet of compressed air onto the washing W placed on the winding band 10.

The embodiment of FIG. 9 uses resiliently mounted presser means, particularly in the form of at least one roller 32 biased by a spring 32a.

Referring to the embodiment of the invention shown in FIG. 10, the winding device A and the feeding and spreading device of the assembly proposed by the invention are two separate devices interlockable for cooperation. The traveling winding device A is of a design similar to the aforedescribed embodiment. Therefore, similar parts are designated by the same reference numerals or letters.

Designing the winding device A as a separate traveling unit has the advantage of permitting the winding device A to be constantly moved between a charging station, i.e. the stationary feeding and spreading device B, and a discharging station, viz. the mangle 15. In a major laundry, consequently, to avoid idling a plurality of winding devices A may be associated with the charging and discharging stations, i.e. the feeding and spreading device B and the mangle 15 or the like, to travel to and fro therebetween.

In the embodiment shown in FIG. 10, the feeding and spreading device B consists of a frame 33 provided with circulating conveyor belts 34 passing over guide rollers 42, 42a, 43 and 44. Obviously, the feeding and spreading device B may also be constructed so as to be movable. The travelling winding device A previously charged with washing W and moved close up to the feeding and spreading device B is coupled with the latter, for example, by means of a readily detachable coupling 35. Preferably, a magnetic coupling 35 is used which comprises an electromagnet 35a mounted on the frame 33 of the feeding and spreading device B to cooperate with an iron plate 35b mounted on the movable frame 12 of the winding device A.

Instead of a magnetic coupling to be actuated for example by interrupting the circuit of the magnet coil, it is also possible to use a mechanical hook coupling capable of being uncoupled by hand or by electrical means, respectively.

The conveyor belts 34 of the feeding and spreading device B and the winding band 10 of the winding device A have a common drive such as an electric motor 36 mounted on the frame 33 of the feeding and spreading device B. The driving connection between the electric motor 36 and the conveyor belts 34 as well as the winding band 10 of the actually associated winding device A is established by endless transmission means 37, 38 and 40 as well as by a gearing 39. In this arrangement, transmission means 38 is disposed to drive a shaft 41 which carries the guide roller 42 for the conveyor belts 34.

For driving the winding band 10, the gearing 39 conveniently includes a friction clutch which, however, may also be provided in any other place of the transmission means. In this case, it would also be possible to provide a governor to ensure constant speed of the winding band 10.

The driving roller 14c of the winding device A, which cooperates with the guide roller 42 of the feeding and spreading device B, is disposed to drive a shaft 46 from which the winding roller 13 can be driven through the intermediary of a belt drive 45, 47 and 91. In this arrangement, the clutch drive may be effected by toothed wheel gearings or friciton gears, respectively.

The winding roller 13 is mounted on an axle 13a provided with a free-wheel to ensure that the winding roller is not driven when washing is being wound onto the winding roller 11.

When unwinding the winding band 10 from the winding roller 13 and winding it onto the winding roller 11 (FIG. 10), it would, however, also be possible to provide no drive at all to the winding roller 13 but to have the unwinding action be brought about merely by the pull exerted on the winding roller 13 by the winding band 10 being wound onto the winding roller 11.

When the winding device A is coupled with the feeding and spreading device B, the guide roller 14 for the winding band 10 engages under the guide roller 43 for the conveyor belts 34.

When pieces of washing W are being wound onto the winding roller 11, the driving roller 14c will make the speed of the winding band 10 agree with the speed of the conveyor belts 34.

On a feeding table 48 and on the conveyor belts 34 of the feeding and spreading device B passing thereover, a transverse spreading unit 49 is arranged between contact rollers 50 and 51.

This transverse spreading unit 49, which is disposed above the conveyor belts 34, can comprise rotatable brush rollers 52 and 52a or spreading rollers 53 and 53a, as illustrated particularly in FIGS. 13 and 14. As will be seen from FIG. 14, the spreading rollers 53 and 53a are provided with flexible strips 54 radially distributed around their periphery.

As illustrated in FIG. 11, such washing spreading means, particularly the brush rollers 52 and 52a, are arranged at an angle to each other above the conveyor belts 34 and provided with a proper drive. In the represented embodiment, the brush roller 52 is driven by a motor 55, while the brush roller 52a is drivable from the brush roller 52 by an interposed bevel gearing 56. Analogously to the aforedescribed embodiment, the brush rollers 52 and 52a are secured to the upwardly pivotable supporting structure 57.

Figures 12, 15:
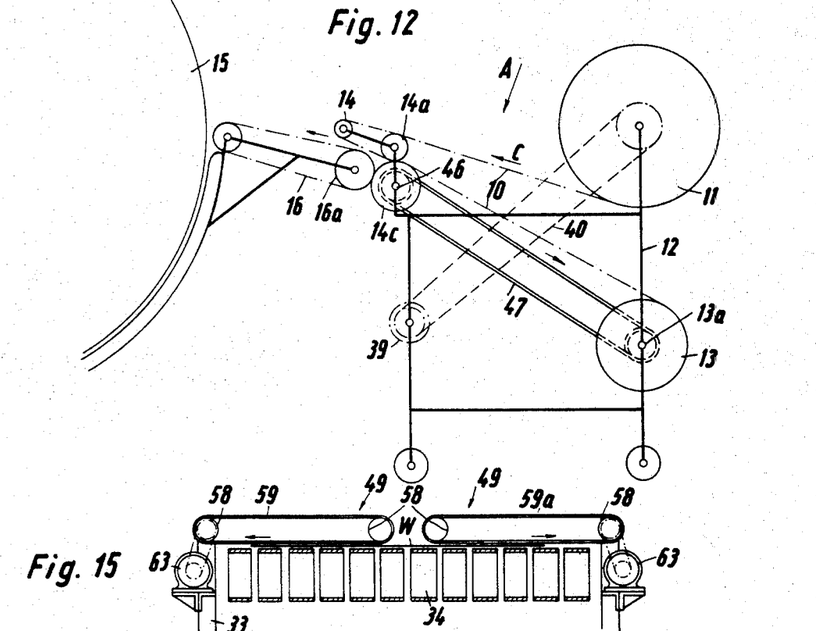
FIG. 12 is a schematic side elevational view of the separate winding device of FIGS. 10 and 11, cooperatively associated with a mangle.
FIGS. 15, 16 and 17 are top plan views of different embodiments of the spreading unit of the feeding and spreading device.

Referring to FIG. 12, the winding band 10 passes over the guide roller 14 and the driving roller 14c, with the guide roller 14 engaging over, but not contacting, the feeding belts 16 of the mangle 15 when this latter is being supplied with washing to the mangled. Conveniently, the winding band 10 is driven in the direction of the arrow c by the frictional engagement of the rotating roller 16a of the feeding belts 16 of the mangle 15 with the driving roller 14c. A toothed-wheel gearing, a worm drive or endless transmission means and the like may also be used. If occasion may arise, the winding band 10 may also be directly driven by the roller 16a of the feeding belts 16 of the mangle 15 in that the winding band 10 is forced against the roller 16a to establish a friction drive. In this case, the driving roller 14c is omitted. Instead of using the spring 14b (FIG. 5), it is also possible to have the pressure roller 14a with perpendicular movability bear by gravity against the driving roller 14c or the roller 16a, respectively.

When unwinding the winding band 10 and feeding the washing W to the mangle 15, a clutch may be provided between the winding device A and the mangle 15 to ensure a satisfactory frictional engagement between the driving roller 14c and the roller 16a, particularly when using a friction drive. Under certain circumstances, the travelling winding device A may be provided with a brake to make it temporarily stationary after having been moved up to the mangle 15.

Referring to the embodiment of FIG. 15, the spreading unit 49 uses endless conveyor belts 59 and 59a which pass over guide rollers 58 and are operable in opposite directions substantially from the middle of the washing W.

Figure 16:
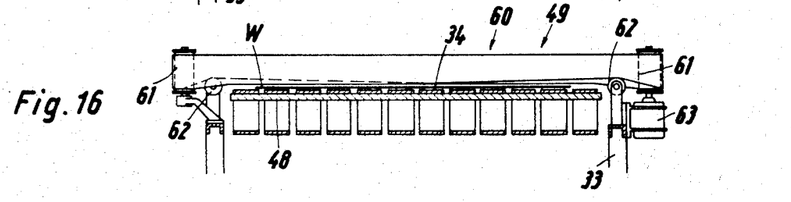
Figure 17:
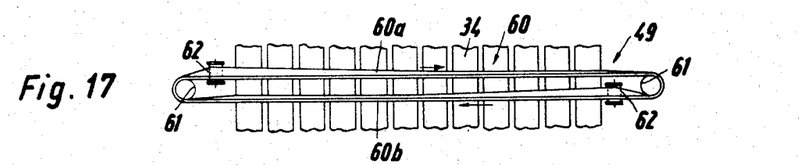

FIGS. 16 and 17 show an embodiment of the spreading unit 49 which uses but a single endless spreading band 60 passing round vertical guide rollers 61 and having two runs 60a and 60b which, seen in the feed direction of the washing W, are guided over horizontal rollers 62 so that the spreading band 60 is twisted and its individual reaches 60a and 60b are partially lifted off the washing W being conveyed. Due to this arrangement, the spreading band 60 is liable to spread and smooth the washing W from the middle thereof outwardly in various directions. For driving the spreading band 60, a motor 63 is provided.

FIG. 11 shows that the washing spreading unit 49, moreover, may be combined with spreading brushes 64 and 64a having a convex surface, which may be arranged in series with or above the conveyor belts 34. The bristle bunches of the two spreading brushes 64 and 64a extend from the middle outwardly toward the lateral edges.

If the washing spreading unit 49 uses the endless belts 59 and the bands 60, as shown in FIGS. 15 to 17, these are conveniently provided with rough surfaces by using an appropriate textile structure or auxiliary means such as plastic strips or the like applied thereto.

Analogous to the brush rollers 52 and 52a the endless conveyor belts 59 and 59a shown in FIG. 15 are also disposed at an angle to each other. Due to the fact that the endless conveyor belts 59 and 59a are driven by the motor 63 to circulate in opposite directions it is insured that the washing W is spread and smoothed from the middle toward its lateral edges.

Figure 18:
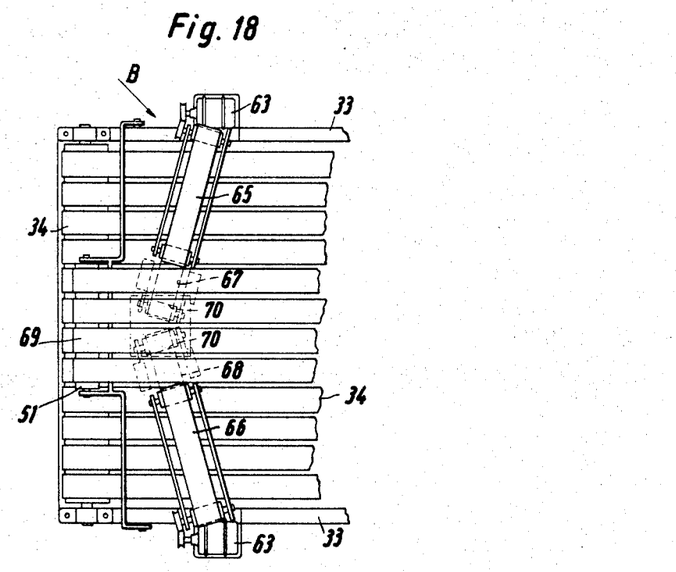
FIG. 18 is a top plan view of part of the feeding and spreading device, showing particularly the spreading unit using power-driven spreading bands as transversal spreading means.
Figure 19:
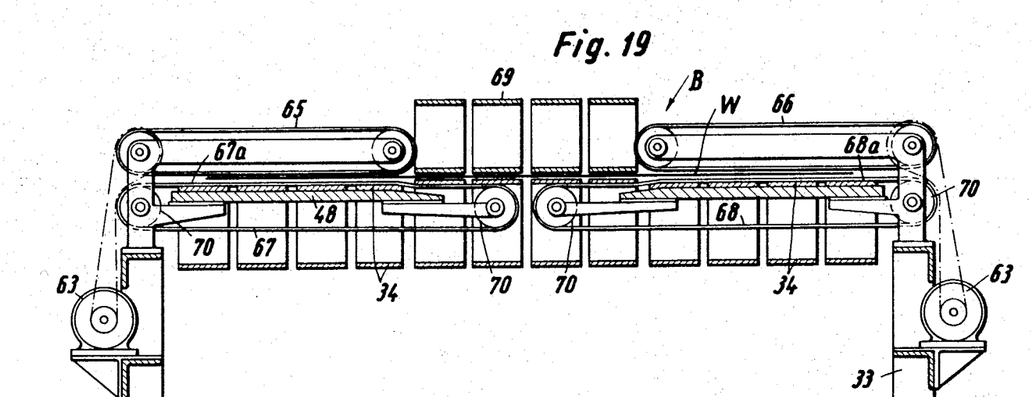
FIG. 19 is an elevational view, on an enlarged scale, of the arrangement shown in FIG. 18.

Referring to the embodiment of FIGS. 18 and 19, a washing spreading device uses transversely extending endless spreading bands 65, 66, 67 and 68 which are arranged above and underneath the conveyor belts 34 and are driven by proper motors 63. The endless spreading bands 65, 66, 67 and 68 likewise are arranged at an angle to each other.

For guiding the washing W when being smoothed between the spreading bands 65, 67 and 66, 68, an upper run 67a or 68a, respectively, of the lower spreading bands 67 and 68 is guided substantially to the middle over the feeding table 48 and the conveyor belts 34.

As can further be seen from FIGS. 18 and 19, a plurality of endless conveyor belts 69 guided by the contact rollers 50 and 51 (see also FIG. 10) are disposed above the conveyor belts 34 substantially in the middle thereof with respect to the feed direction, and below the conveyor belts 69 the washing W is conveyed along by the conveyor belts 34 on which it rests. FIG. 19 also shows that substantially in the middle of the region of the conveyor belts 69, the upper run 67a of the lower spreading bands 67 or the upper run 68a of the lower spreading bands 68, respectively, passes over guide rollers 70 below the conveyor belts 34, whereas laterally of the conveyor belts 69 it passes over the conveyor belts 34. By this arrangement the washing W is satisfactorily spread and smoothed toward the lateral edges by means of the endless spreading bands 65, 66, 67 and 68 and the washing W is rapidly engaged by the washing spreading device.

The technical progress obtained by such band conduct of the transversal washing spreading device consists in the following:

The upper and underside of the washing are engaged at the same time. That these bands are capable of acting upon the washing at all is rendered possible only by the special way the bands are guided. The end aimed at is to guide the washing first between two superposed bands running transversely of the washing. This can be attained only if the washing is progressively fed between these transverse bands the speeds of which must be in a special ratio to the advancing movement of the conveyor belts 34, depending on the angle setting, for in consequence of their agle setting there results also an advancing movement of the transverse bands. This must not be too small to avoid damming up of the washing in front of the transverse bands but neither must it be too great to prevent the washing from getting creased toward the end.

Figure 20:
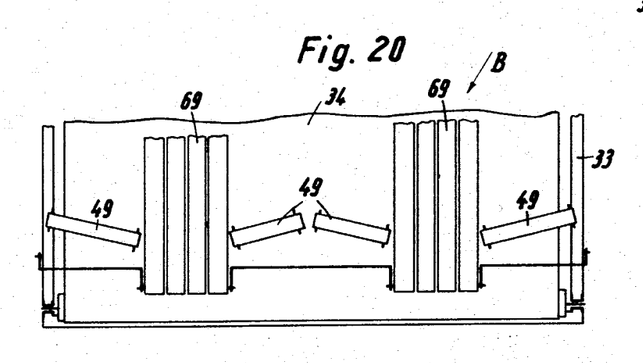
FIG. 20 is a schematic top plan view of another embodiment of the feeding and spreading device.

FIG. 20 shows another embodiment of the feeding and spreading device B in which the attached device for feeding different large pieces of washing W between several runs formed by several upper conveyor belts 69, as e.g. in FIG. 19, is provided with additional transverse washing spreading units 49 constituted by rollers, endless bands or the like designed in accordance with the different embodiments described. Small pieces of washing W will be smoothed toward both sides by the central washing spreading unit 49, whereas large pieces of washing W such as sheets can be spread and smoothed merely by the lateral washing spreading units 49. In the latter case, the central washing spreading units 49 are lifted in the above-described manner and put out of service.

Figure 21:
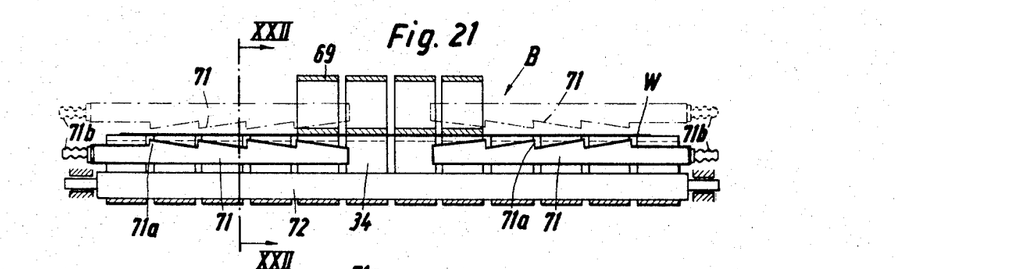
FIG. 21 is a schematic elevational view, partly in section, of a different embodiment of the spreading means.
Figure 22:
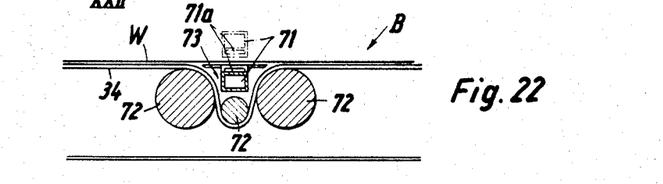
FIG. 22 is a cross section taken on line XXII—XXII of FIG. 21.

FIGS. 21 and 22 show a further embodiment of the washing spreading device using air jet systems 71 arranged transversely of the feed direction of the washing W below or above the latter. At the same time, the conveyor belts 34 supporting the washing W are guided downwardly over several guide rollers 72 so that a gap 73 is defined in which are disposed the air jet systems 71 that spread or smooth the washing W in the transverse direction. The air jet systems 71 include pipes arranged below and/or above the conveyor belts 34 and provided with outwardly directed air outlet jets 71a. For connecting the air jet systems 71 to a compressed-air source by means of hoses, connections 71b are provided.

Figure 26:
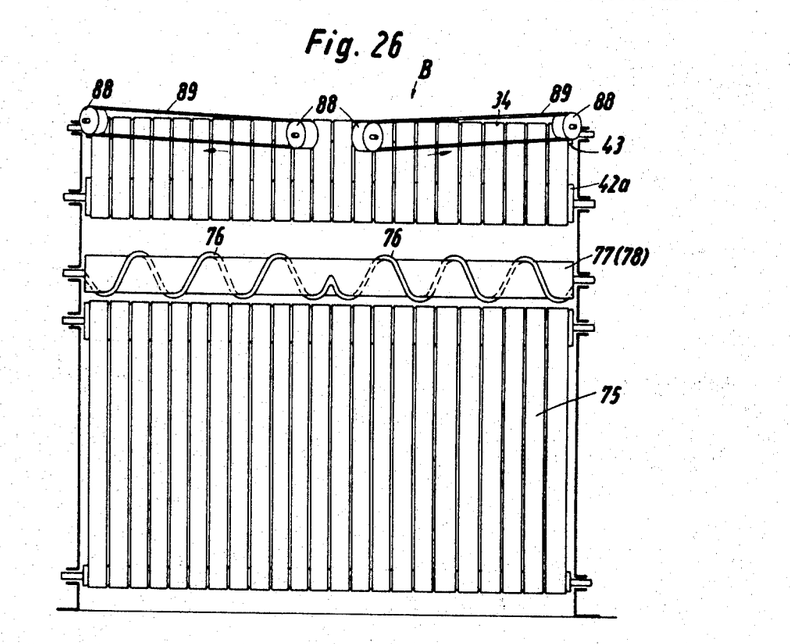
FIG. 26 is a front elevational view of a detail of the feeding and spreading device shown in FIGS. 23 to 25, with the inclined wall having been omitted.

In the embodiment of the invention illustrated in FIG. 23, the winding device A and the feeding and spreading device B are in principle of the same design as in the embodiment of FIG. 10. Identical parts are therefore designated by the same reference numerals. Differing from the embodiment of FIG. 10, however, the represented washing spreading device uses a band 89 passing over guide rollers 88. Contrary to the already described embodiments, two spreading rollers 77 and 78 are provided which join up with a preferably ascending conveyor belt 75 below the conveyor belts 34 of the feeding and spreading device B. As a special feature, the spreading rollers 77 and 78 are fitted with a pair of helical ribs 76 (FIG. 26) acting from the center in opposite directions.

Figure 24:
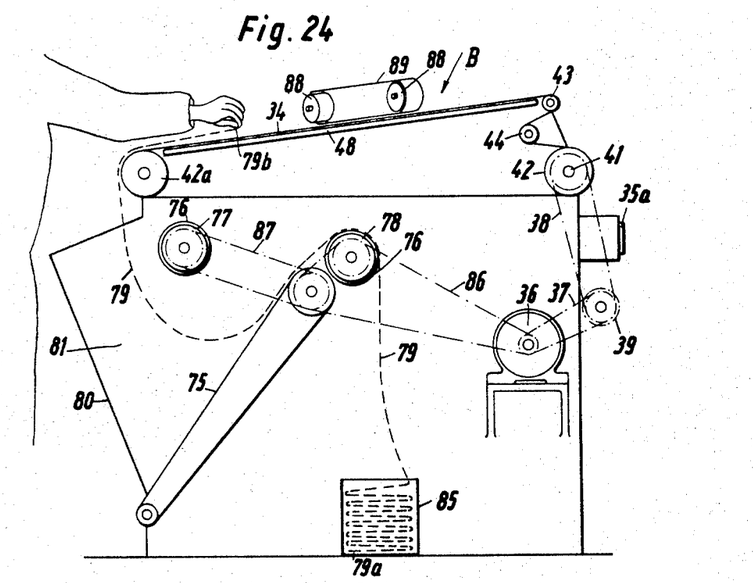
FIG. 24 is a schematic view of the feeding and spreading device of FIG. 23, shown while receiving a piece of washing placed on the feeding and spreading device.
Figure 25:
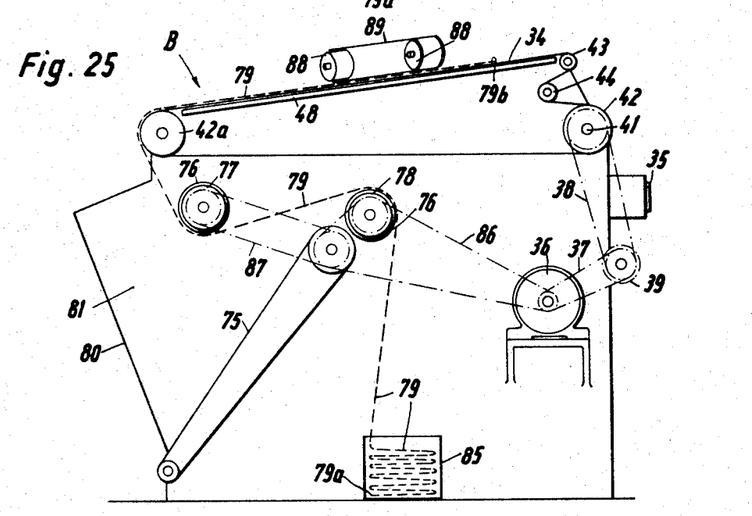
FIG. 25 is a similar view showing the feeding and spreading device at a subsequent stage of operation with respect to FIG. 23, with the piece of washing having made progress toward the winding device.

A piece of washing W such as a sheet 79 after having been placed on the conveyor belt or belts 75 first will be fed with a leading edge 79a over the first spreading roller 78 and then depends therefrom as shown in FIG. 23. Subsequently, it will be placed, for example in zig-zag fashion, into a collecting bin 85 as shown in FIG. 24. Following thereon, after having placed the trailing edge 79b of the sheet 79 by hand on the conveyor belt 34, the sheet will be guided over the second spreading roller 77 in a direction opposite to the feed direction, as can be seen from FIG. 25, and repeatedly spread and stretched laterally outwards.

Below the conveyor belts 34, the conveyor belt or belts 75 together with an expediently inclined wall 80 define a feed hopper 81 for the washing W.

The spreading rollers 77 and 78 of the feeding and spreading device B are also driven by the motor 36 through the intermediation of endless belts or chains 86 and 87. They are continuously driven in the same direction of rotation.

The spreading rollers 77 and 78 and the upper conveyor belt or belts 75 may, if desired, be adapted to be uncoupled from the motor 36 driving the conveyor belts 34 and the winding device A.

Figures 27, 28:
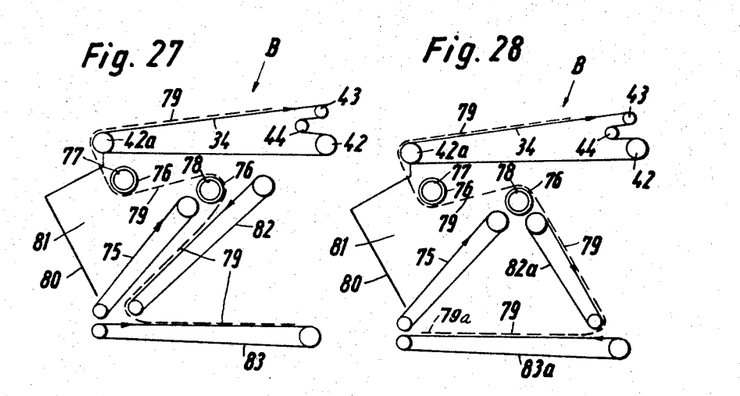
FIGS. 27 and 28 are schematic views of two different arrangements of conveyor belts used for feeding long pieces of washing.

In the embodiments of FIGS. 27 and 28, to handle very long pieces of washing W, e.g. sheets 79, several conveyor belts 82 and 83 are provided below the first spreading roller 78 and serve to guide the sheet 79 while the collecting bin is omitted. If desired, these conveyor belts 82 and 83 may be adapted to exert an additional spreading action on the washing W, particularly sheets 79. In the embodiment of FIG. 27, the conveyor belt 82 is arranged for downward feed substantially parallel to the upwards feeding conveyor belt or belts 75 and the conveyor belt 83 is arranged to extend in a substantially horizontal plane.

The embodiment of FIG. 28 uses an endless conveyor belt 82a set at an angle to the conveyor belt 75 to feed the leading edge 79a of the sheet 79 to a conveyor belt 83a driven to move in a direction opposite to the direction of movement of the conveyor 83 of FIG. 27.

The endless conveyor belts 75, 82, 83, 82a and 83a, which pass over rollers, may also be driven by the single driving motor 36 through the intermediary of appropriate transmission means.

Figure 29:
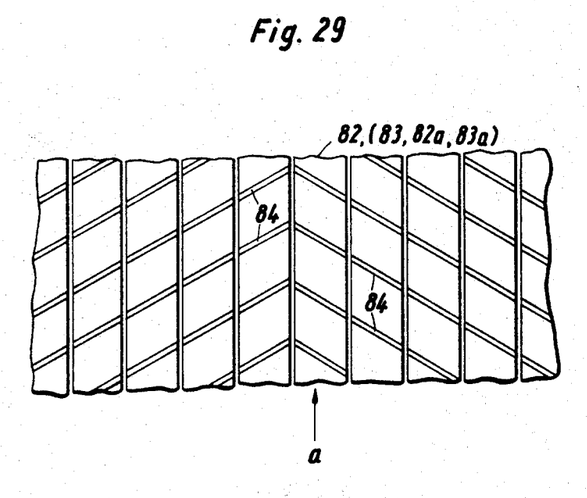
FIG. 29 is a detailed view of a plurality of conveyor belts in side-by-side arrangement and provided with diagonal spreading ribs.

As can be seen from FIG. 29, the conveyor belts 82, 83, 82a and 83a are provided with ribs 84 extending from the middle diagonally outwards in a direction opposite to the feed direction to obtain an additional spreading of the washing W. The conveyor belts 75 may be provided with similarly arranged ribs.

The ribs 76 of the spreading rollers 77 and 78 and the ribs 84 of the conveyor belts 75, 82, 83, 82a and 83a and, if occasion may arise, also any ribs of the conveyor belts 34 are expediently constituted by known adhesive tapes or strips provided with hook means. Strips of this kind in the form of surface slide-fasteners which by appropriate treatment of their surface are provided with a plurality of hook means are known per se.

The use of adhesive tapes or strips provided with hook means for ribs of spreading rollers or conveyor belts has the considerable advantage of ensuring a reliable grip on the frequency slippery washing.

It is also possible to provide more than two spreading rollers 77, 78 below the conveyor belts 34.

The invention may be embodied in other specific forms without departing from the spirit or essential characteristics thereof. The present embodiments are therefore to be considered in all respects as illustrative and not restrictive, the scope of the invention being indicated by the appended

We claim:

1. The combination of a textile fabric processing machine and a transportable winding device which feeds textile fabrics to or receives textile fabrics from said processing machine; said winding device including at least two winding rolls and a winding band adapted to be wound onto and from said winding rolls; said transportable winding device further having a coupling means corresponding to complementary coupling means mounted on said processing machine, these means being positioned so that said winding device is releasably coupled to said processing machine when said machine and device are in closely adjacent, operative contact; said processing machine having a first drive means; said winding band being provided with a second drive means which, when the coupling means of the winding device is engaged with the coupling means of the processing machine, is in releasable driving contact with said first drive means; said second drive means on said transportable winding device thereby being driven in a similar direction and at a speed synchronous to that of said processing machine.

2. The combination of claim 1, wherein the textile processing machine is a feeding and spreading device for flatwork.

3. The combination of a textile processing machine and a transportable winding device which feeds textiles to or receives textiles from said textile processing machine; said winding device including at least two winding rolls and a winding band adapted to be wound onto and from said winding rolls, said band being guided so as to extend horizontally, in the form of a table-like surface from the upper of said rolls to and about a guide roller and then toward the lower of said winding rolls; spreading means mounted above said table-like surface of said winding band, said spreading means comprising two independent, commonly driven, friction brush rollers which are disposed at an angle relative to one another, and which are inclined at the same angle relative to the conveying direction of said winding band; and drive means on said textile processing machine in driving engagement with cooperating drive means on said textile processing machine, whereby said winding band on said winding device will be driven in a similar direction and at a similar speed to that of said textile processing machine.

4. The combination of claim 3, wherein said brush rollers are mounted on a supporting structure which is pivotal upwardly from the table-like surface of said winding band.

5. The combination of claim 3, wherein means are mounted adjacent the table-like surface for pressing said textiles against said winding band.

6. The combination of claim 3, wherein said winding band consists of air permeable materials.

7. The combination of a textile processing machine and a transportable winding device which feeds textiles to or removes textiles from said textile processing machine; said winding device including at least two winding rollers and a winding band adapted to be wound onto and from said winding rolls; said winding device having a coupling means and a driving device about which said winding band is guided; said textile processing machine comprising a feeding and spreading device; said feeding and spreading device being provided with a complementary coupling means corresponding to the coupling means of the winding device and with a driving roller for spaced, longitudinally extending, feeding and spreading conveyor belts, said driving roller being positioned so that, when the coupling means of the winding device is engaged with the coupling means of the feeding and spreading device, the said driving roller is in contact with the driving device on the said winding device through the interposition of said longitudinal conveyor belts, said winding band being driven in a similar direction and at the same speed as said conveyor belts.

8. An assembly as claimed in claim 7, wherein an endless spreader band extends transversely of the said conveyor belts, said band having guide rollers on opposite ends, which rollers are on axes substantially perpendicular to the plane of said belts, each of the reaches of said band having an idler roller engaging said reach as it leaves said idler roller in the direction of movement of the belt, each said idler roller tilting said associated reach and slightly lifting the lower edge thereof.

9. An assembly as claimed in claim 7 wherein in the central region of said conveyor belts there are positioned above the same a second group of conveyor belts which are against and opposed to the first conveyor belts and have in the zone of contact the same feed speed and conveying direction as the said first conveyor belts, and wherein independently driven spreading bands disposed at an inclination at both sides of the conveyor belts are arranged in pairs in superposed relation, the upper reach of the lower spreading bands being guided over the upper reaches of the conveyor belts and cooperating by frictional engagement with the lower reaches of the upper spreading bands.

References Cited

UNITED STATES PATENTS

| | | | |
|---|---|---|---|
| 1,684,451 | 9/1928 | Lowe | 38—8 |
| 1,912,724 | 6/1933 | Remington | 38—8 |
| 2,070,996 | 2/1937 | Meyer | 38—10 |
| 2,110,437 | 3/1938 | Couch | 38—143 X |
| 2,328,643 | 9/1943 | Hart | 38—9 X |
| 2,508,096 | 5/1950 | Borgos | 38—143 |
| 2,568,451 | 9/1951 | Kahl | 38—11 |
| 2,585,834 | 2/1952 | Pocock | 38—143 |
| 2,635,370 | 4/1953 | Mann | 38—143 |
| 2,829,451 | 4/1958 | Hajos | 38—8 |
| 2,878,602 | 3/1959 | Broad | 38—143 |
| 3,137,767 | 6/1964 | Axon et al. | 242—55.12 |
| 3,174,238 | 3/1965 | Grantham | 38—143 |
| 3,198,516 | 8/1965 | Withorn et al. | 38—143 |
| 3,228,127 | 1/1966 | Roiland | 38—143 |

JORDAN FRANKLIN, *Primary Examiner.*

G. V. LARKIN, *Assistant Examiner.*

U.S. Cl. X.R.

38—8, 143; 242—55.12